(12) United States Patent
Tamura et al.

(10) Patent No.: US 10,496,874 B2
(45) Date of Patent: Dec. 3, 2019

(54) FACIAL DETECTION DEVICE, FACIAL DETECTION SYSTEM PROVIDED WITH SAME, AND FACIAL DETECTION METHOD

(71) Applicant: PANASONIC INTELLECTUAL PROPERTY MANAGEMENT CO., LTD., Osaka (JP)

(72) Inventors: Hajime Tamura, Tokyo (JP); Hiroaki Yoshio, Kanagawa (JP); Kazuki Maeno, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 127 days.

(21) Appl. No.: 15/765,951

(22) PCT Filed: Sep. 28, 2016

(86) PCT No.: PCT/JP2016/004362
§ 371 (c)(1),
(2) Date: Apr. 4, 2018

(87) PCT Pub. No.: WO2017/064838
PCT Pub. Date: Apr. 20, 2017

(65) Prior Publication Data
US 2018/0307896 A1 Oct. 25, 2018

(30) Foreign Application Priority Data
Oct. 14, 2015 (JP) .................................. 2015-202852

(51) Int. Cl.
*G06K 9/00* (2006.01)
*G06T 7/11* (2017.01)

(52) U.S. Cl.
CPC ..... *G06K 9/00268* (2013.01); *G06K 9/00288* (2013.01); *G06T 7/11* (2017.01); *G06T 2207/30201* (2013.01)

(58) Field of Classification Search
CPC ........... G06K 9/00268; G06K 9/00288; G06K 9/6201; G06K 9/4614; G06K 9/03; G06K 9/00261; G06T 7/11; G06T 2207/30201
See application file for complete search history.

(56) References Cited

U.S. PATENT DOCUMENTS 9,092,660 B2 7/2015 Yamada et al.
9,621,779 B2 4/2017 Aoki et al.
(Continued)

FOREIGN PATENT DOCUMENTS

| JP | 2008-090452 | 4/2008 |
| JP | 2008-250999 A | 10/2008 |
| JP | 2009-188837 A | 8/2009 |

OTHER PUBLICATIONS

U.S. Appl. No. 15/744,472 to Shogo Tanaka et al., which was filed on Jan. 12, 2018.
(Continued)

*Primary Examiner* — Phuoc Tran
(74) *Attorney, Agent, or Firm* — Greenblum & Bernstein, P.L.C.

(57) ABSTRACT

In order to eliminate erroneous detection in a case where a plurality of facial regions are detected in a captured image, facial detection device (2) of the present disclosure is a facial detection device that detects a facial region of a person from captured images which are continuous in time series, including a processor (15) that performs facial detection processing of detecting the facial region from the captured images and error determination processing of calculating a moving direction of each facial region between the captured images that are sequential in time series, and determining whether
(Continued)

or not the detection as a facial region is correct with respect to a plurality of facial regions in which a correlation degree in the moving directions of the facial regions is equal to or larger than a predetermined threshold value, in a case where a plurality of facial regions are detected.

6 Claims, 9 Drawing Sheets

(56) References Cited

U.S. PATENT DOCUMENTS

| | | | |
|---|---|---|---|
| 2009/0207260 A1 | 8/2009 | Furukawa | |
| 2011/0267489 A1* | 11/2011 | Sagawa | G06K 9/3233 348/222.1 |
| 2015/0102998 A1* | 4/2015 | Oami | H04N 5/74 345/156 |
| 2016/0148381 A1 | 5/2016 | Aoki et al. | |

OTHER PUBLICATIONS

International Search Report issued in WIPO Patent Application No. PCT/JP2016/004362, dated Dec. 27, 2016.

\* cited by examiner

FIG. 5

| TRACKING ID | TRACKING ID | (t-1)TH FRAME DETECTION RESULT | t-TH FRAME DETECTION RESULT | MOVING DIRECTION |
|---|---|---|---|---|
| 1 | ON | CENTER OF GRAVITY a1, SCORE 96 | CENTER OF GRAVITY a2, SCORE 93 | BOTTOM LEFT |
| 2 | ON | CENTER OF GRAVITY b1, SCORE 62 | CENTER OF GRAVITY b2, SCORE 65 | BOTTOM LEFT |
| ⋮ | ⋮ | ⋮ | ⋮ | ⋮ |

FACIAL DETECTION DEVICE, FACIAL DETECTION SYSTEM PROVIDED WITH SAME, AND FACIAL DETECTION METHOD

TECHNICAL FIELD

The present disclosure relates to a facial detection device that detects a facial region of a person from images that are continuous in time series, a facial detection system including the facial detection device, and a facial detection method.

BACKGROUND ART

In the related art, there is known a technology of detecting a facial region of a person from captured images of a person captured by a camera for the purpose of face authentication, face collation, and the like. Such a facial detection technology detects eyes, a nose, a mouth, and the like, which are feature portions of a face, from captured images as facial feature points and detects a facial region based on the detected facial feature points (for example, PTL 1).

CITATION LIST

Patent Literature

PTL 1: Japanese Patent Unexamined Publication No. 2008-90452

SUMMARY OF THE INVENTION

However, since a facial feature point is a set of pixel points of feature portions in a captured image, a facial feature point may be detected in a portion other than a facial region of a person. In a case where a facial feature point is detected in a portion other than the facial region, the facial region detected based on the facial feature point is naturally erroneously detected. For example, as shown in FIGS. 3A and 3B, in a case where a facial feature point is detected in collar portion 23 of clothes 22 of person 21, collar portion 23 is erroneously detected as facial regions $B_{t-1}$ and $B_t$. If such an erroneous detection occurs, since subsequent processing using the detected facial region (for example, facial authentication processing, facial collation processing, and the like) will be affected, it is desirable to eliminate erroneous detection. Particularly, as in the examples of FIGS. 3A and 3B, in a case where a plurality of facial regions are detected in a captured image, erroneous detection is highly likely to be included in the detected facial regions, and thus it is particularly desirable to eliminate erroneous detection in such a case.

The present disclosure has been devised in view of such problems of the prior art, and the main object of the present disclosure is to provide a facial detection device capable of eliminating erroneous detection in a case where a plurality of facial regions are detected in a captured image, a facial detection system including the facial detection device, and a facial detection method.

The facial detection device of the present disclosure is a facial detection device that detects a facial region of a person from captured images that are continuous in time series, including a processor that performs facial detection processing of detecting the facial region from the captured images and error determination processing of calculating a moving direction of each facial region between the captured images that are sequential in time series, and determining whether or not the detection as a facial region is correct with respect to a plurality of facial regions in which a correlation degree in the moving directions of the facial regions is equal to or larger than a predetermined threshold value, in a case where a plurality of facial regions are detected.

According to the present disclosure, it is possible to eliminate erroneous detection in a case where a plurality of facial regions are detected in a captured image.

BRIEF DESCRIPTION OF DRAWINGS

FIG. 5 is a diagram showing an example of a tracking result.

DESCRIPTION OF EMBODIMENTS

Figure 1:
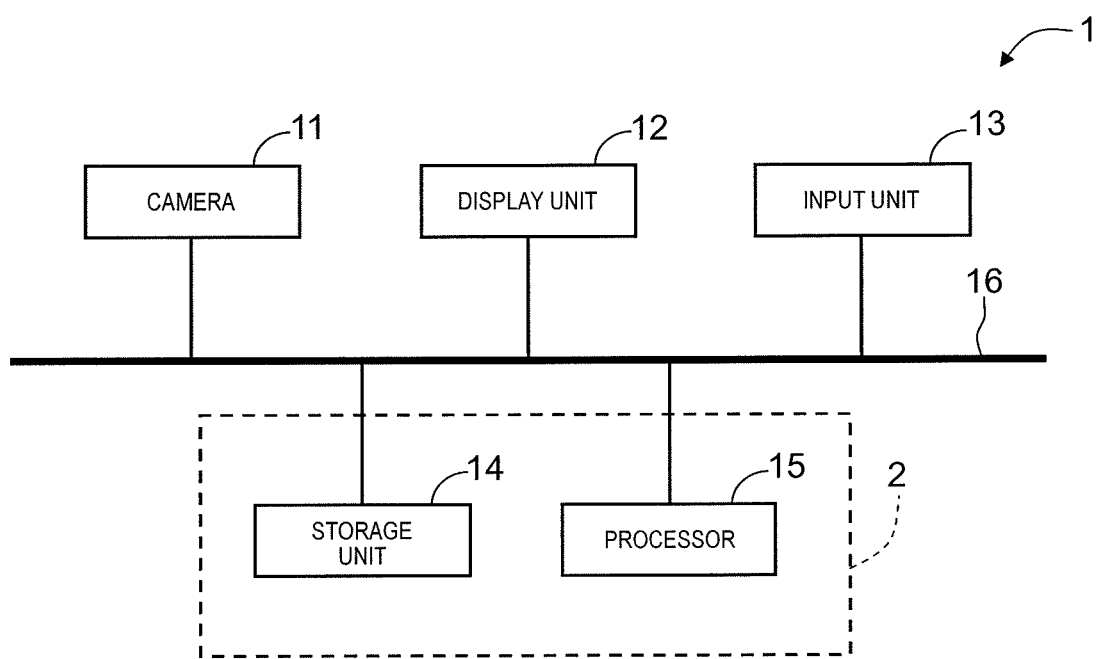
FIG. 1 is a block diagram showing a hardware configuration for realizing a facial detection system of the present disclosure.

A first disclosure to solve the above problem is a facial detection device that detects a facial region of a person from captured images that are continuous in time series, including a processor that performs facial detection processing of detecting the facial region from the captured images and error determination processing of calculating a moving direction of each facial region between the captured images that are sequential in time series, and determining whether or not the detection as a facial region is correct with respect to a plurality of facial regions in which a correlation degree in the moving directions of the facial regions is equal to or larger than a predetermined threshold value, in a case where a plurality of facial regions are detected.

According to the facial detection device according to the first disclosure, in a case where a plurality of facial regions are detected in the captured images, it is possible to perform error determination processing of determining whether the facial regions are correct as facial regions with respect to the plurality of facial regions having a high correlation degree in moving directions between the captured images that are sequential in time series. The plurality of facial regions having a high correlation degree in the moving directions are highly likely to include a portion moving together with the facial regions of the person (for example, a collar portion of the clothes that the person is wearing) as erroneous detection. Therefore, it is possible to eliminate erroneous detection such as portion moving together with the facial regions of the person by performing the error determination processing on the plurality of facial regions with a high correlation degree in the moving directions. In addition, by calculating the correlation degree in the moving directions between the captured images that are sequential in time series, it is possible to accurately determine the correlation degree in the moving directions of the facial regions.

In addition, according to a second disclosure, in the first disclosure, by performing the error determination processing, a facial region having the largest evaluation value of facial likeness of the facial region is determined as correct detection and the other facial regions are determined as erroneous detection, in the plurality of facial regions in which the correlation degree in the moving directions of the facial regions is equal to or larger than the predetermined threshold value.

According to the facial detection device according to the second disclosure, for a plurality of facial regions in which a correlation degree in moving directions of facial regions is equal to or larger than a predetermined threshold value, it is possible to determine whether the detection as a facial region is correct or not by comparing the evaluation values of facial likeness of respective facial regions with each other. In this manner, it is possible to simply and easily eliminate erroneous detection in a case where a plurality of facial regions are detected in the captured images.

In addition, in a third disclosure, in the first disclosure, a facial region whose coordinate value at a center of gravity of the facial region in a height direction of a person is an extreme value, is determined as correct detection and the other facial regions are determined as erroneous detection, in the plurality of facial regions in which the correlation degree in the moving directions of the facial regions is equal to or larger than the predetermined threshold value.

According to the facial detection device according to this third disclosure, for a plurality of facial regions in which a correlation degree in moving directions of the facial regions is equal to or larger than a predetermined threshold value, it is possible to determine whether the detection as a facial region is correct or not by comparing a coordinate value in a height direction of a person at a center of gravity of each facial region. As in the example of FIG. 3 described above, a facial region determined to be correct is often located above a facial region determined to be erroneous. Therefore, it is possible to simply and easily eliminate erroneous detection by determining a facial region whose coordinate value in the height direction of the person at the center of gravity is an extreme value as correct detection.

In addition, in a fourth disclosure, in the first disclosure, by performing the error determination processing, a facial region in which an evaluation value of facial likeness of the facial region is equal to or larger than a predetermined threshold value is determined as correct detection and the other facial regions are determined as erroneous detection, in the plurality of facial regions in which the correlation degree in the moving directions of the facial regions is equal to or larger than the predetermined threshold value.

According to the facial detection device according to this fourth disclosure, for a plurality of facial regions in which a correlation degree in moving directions of facial regions is equal to or larger than a predetermined threshold value, it is possible to determine whether the detection as a facial region is correct or not by comparing the evaluation value of facial likeness of each facial region with a predetermined threshold value. In this manner, it is possible to simply and easily eliminate erroneous detection in a case where a plurality of facial regions are detected in the captured images. In addition, since all facial regions having high evaluation values of facial likeness are determined as correct detection, for example, even in a case where a plurality of persons are walking side by side, the facial regions of each person may be detected.

In addition, a fifth disclosure is a facial detection system including a facial detection device in any one of the first to fourth disclosures and an imaging device for continuously imaging a vehicle in time series.

In addition, a sixth disclosure is a facial detection method for detecting a facial region of a person from continuously captured images in time series, a facial detection processing step of detecting the facial region from the captured images and an error determination processing step of calculating a moving direction of each facial region between the captured images that are sequential in time series, and determining whether or not the detection as a facial region is correct with respect to a plurality of facial regions in which a correlation degree in the calculated moving directions of the facial regions is equal to or larger than a predetermined threshold value, in a case where a plurality of facial regions are detected.

Hereinafter, an embodiment of the present disclosure will be described with reference to drawings.

The facial detection system according to the present disclosure is a system that detects a facial region of a person from captured images of the person captured by an imaging device, which may be applied to, for example, a facial authentication system, a facial collation system, a facial retrieval system, and various analysis systems (for example, customer base analysis system) that statistically analyze detected facial regions. Hereinafter, a case where the facial detection system according to the present disclosure is applied to a face authentication system will be described.

FIG. 1 is a block diagram showing a hardware configuration for realizing the facial detection system according to the present disclosure. As shown in FIG. 1, the hardware configuration includes camera (imaging device) 11, display unit 12, input unit 13, storage unit 14, processor 15, and bus 16 connecting the units. Storage unit 14 and processor 15 are components of facial detection device 2 according to the present disclosure.

Camera 11 is a general imaging device such as a CCD camera or the like, which is disposed in the vicinity of an entrance of a building and captures images continuously in a time series (temporally) from the substantially front side (substantially front) of person 21 entering the entrance. The captured images (hereinafter, also referred to as "image frames" or simply "frames") captured by camera 11 continuously in time series are input to processor 15. The form, function, arrangement, quantity, and the like of camera 11 are not particularly limited as long as it is possible to image person 21 from substantially the front side, and various changes are possible.

Display unit 12 is a general display device such as a monitor (display), for example, and is used for displaying the processing result in processor 15 and the like. The processing result of processor 15 may be output to an external system such as a face authentication system instead of display unit 12.

Input unit 13 is, for example, an input device such as a keyboard or a mouse, and is used by a user to input various instructions to facial detection device 2.

Storage unit 14 is, for example, a storage device (storage) such as a ROM or a hard disk, and stores various programs and various data for realizing each function of facial detection device 2. In addition, storage unit 14 also stores the detection result and the determination result in processor 15.

Processor 15 is, for example, a CPU, reads various programs and various data from storage unit 14 onto a RAM (not shown), and executes each processing of facial detection device 2. In addition, the processor 15 performs overall control of facial detection device 2 and facial detection system 1 as a whole. More specifically, processor 15 performs facial detection processing for detecting a facial region of a person from the captured images input from camera 11, and in a case where a plurality of facial regions are detected in the captured images, processor 15 further performs error determination processing on the detected facial regions. The above facial detection processing and error determination processing are performed for each image frame.

Figure 2:
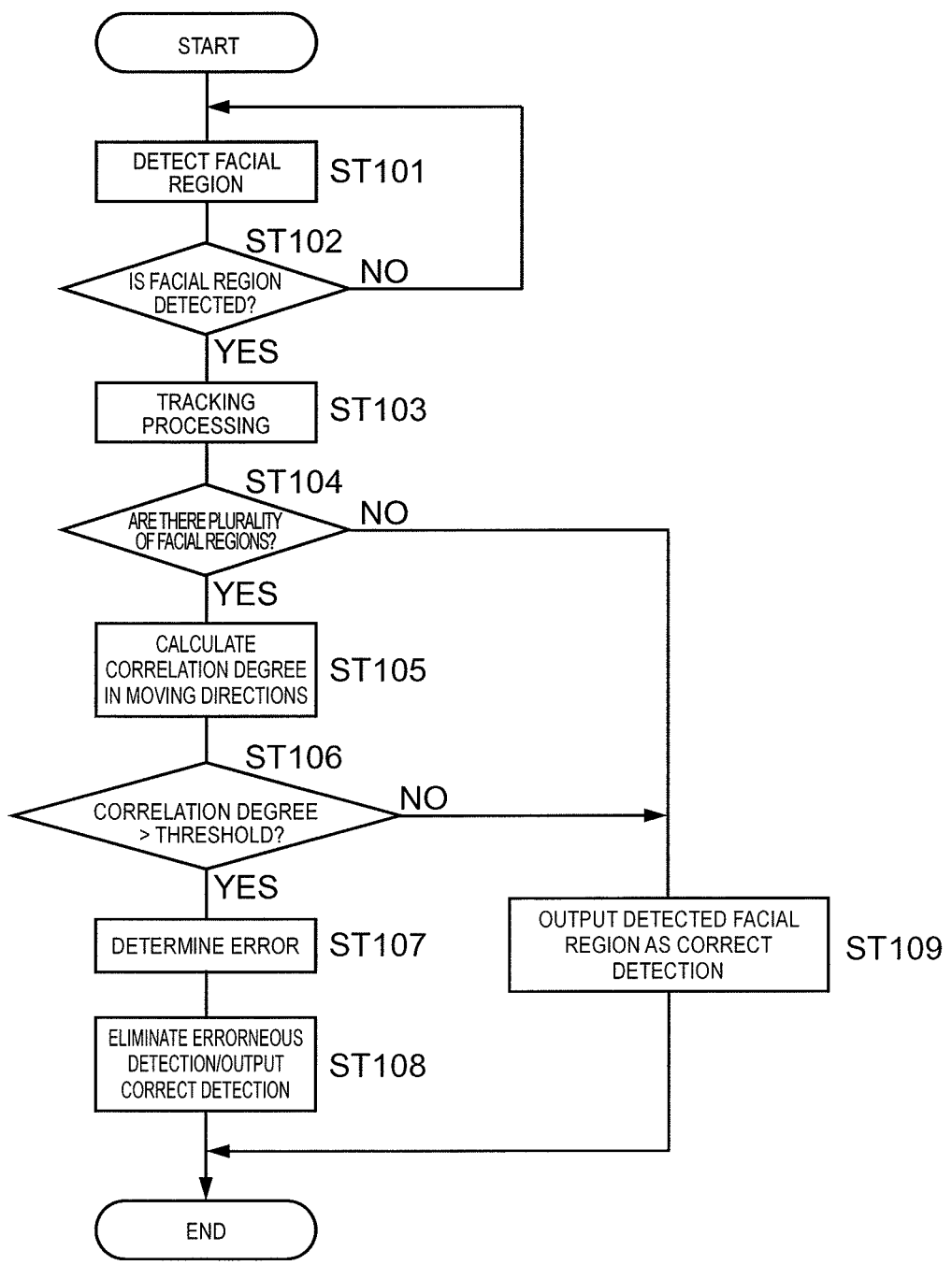
FIG. 2 is a flowchart showing a flow of facial detection processing by a processor.

FIG. 2 is a flowchart showing the flow of facial detection processing and error determination processing by processor 15. With reference to FIG. 2, a flow of processing by processor 15 will be described. This processing is performed for the t-th frame.

First, from the captured images input from the camera 11, a facial region of the person is detected (step ST101). Detection of the facial region is performed using a known method in the related art. Specifically, first, for each predetermined region (face candidate region) in the captured images, a feature amount used in a known facial detection method such as Haar-Like feature amount and the like is extracted. Next, the extracted feature amount is compared with a learning model learned beforehand. Then, based on the comparison result, the facial likeness of the face candidate region is calculated as an evaluation value. In a case where the calculated evaluation value is equal to or larger than predetermined threshold value T1, the face candidate region is set as a facial region. As the evaluation value, a score of 1 to 100 may be used. A standard value is 50, and the larger the value, the higher the facial likeness. In the present embodiment, threshold value T1 is set to 60.

Figure 3A:
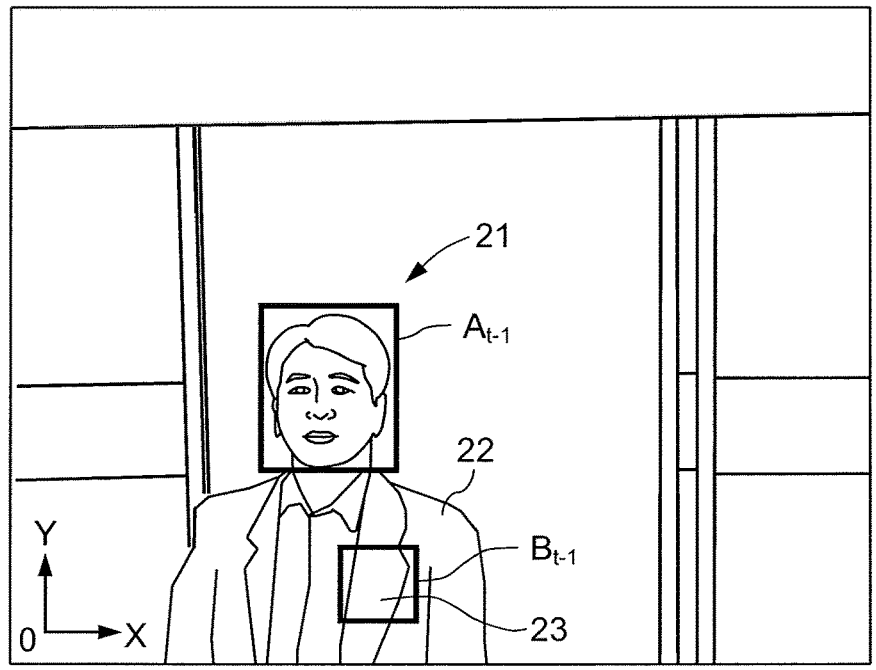
FIG. 3A is a diagram showing a detection result in a (t-1)th frame as an example of a detection result of a facial region.
Figure 3B:
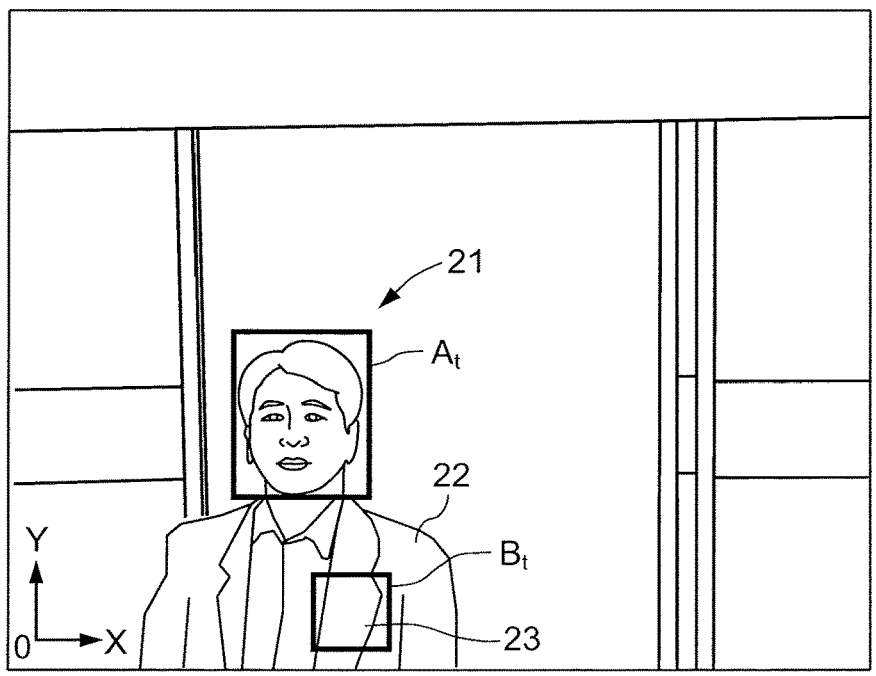
FIG. 3B is a diagram showing a detection result in a t-th frame as an example of a detection result of the facial region.

FIGS. 3A and 3B are diagrams showing examples of captured images (image frames) of person 21 captured from the substantially front side by camera 11, FIG. 3A shows the detection result in the (t−1)th frame, and FIG. 3B shows the detection result in t frame. The horizontal direction in the captured images is an x coordinate, and the vertical direction is a y coordinate. The y coordinate is the height direction of person 21. As shown in FIG. 3A, two facial regions, facial region $A_{t-1}$ which is correct detection (i.e., detected correctly) and facial region $B_{t-1}$ which is erroneous detection, are detected in the (t−1)th frame. In addition, as shown in FIG. 3B, in the t-th frame, two facial regions, facial region $A_t$ as correct detection and facial region $B_t$ as erroneous detection, are detected. Since a facial region is detected based on the feature amount extracted from the captured images as described above, depending on the images, a facial region may be detected in a portion other than the person's facial region in some cases. In the example of FIG. 3, collar portion 23 of clothes 22 of person 21 is erroneously detected as facial regions $B_{t-1}$ and $B_t$.

Subsequently, it is determined whether or not a person's facial region has been detected from the captured images (step ST102). In a case where it is determined that a facial region is detected (step ST102: Yes), the processing proceeds to step ST103, and in a case where if it is determined that a facial region has not been detected (step ST102: No), the processing returns to step ST101.

In step ST103, tracking processing is performed for each detected facial region. In the tracking processing, the same facial regions are associated with each other between two image frames that are adjacent in time series, and the tracking state and the moving direction of the facial regions are detected. The association of the facial regions is set based on the coordinates of the center of gravity of the facial regions, luminance information, and the like. The tracking state is ON in a case where the same facial region exists between two adjacent image frames, and OFF in a case where the same facial region does not exist.

Figure 4:
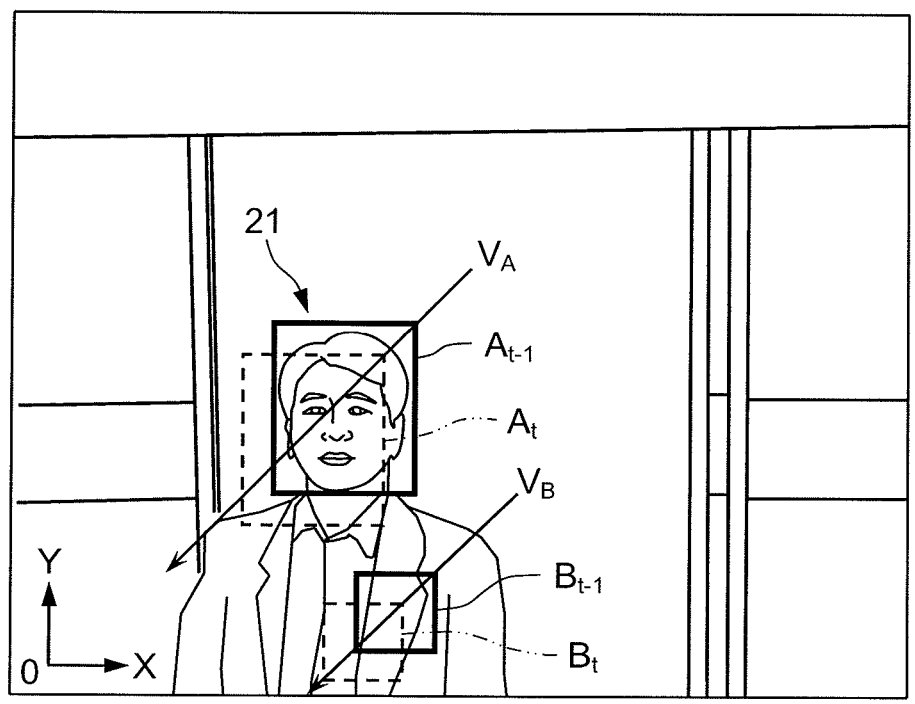
FIG. 4 is a diagram for explaining a moving direction of each facial region between image frames.

The moving direction of the facial region is obtained as a direction of the movement vector passing through the center of gravity of each facial region. Specifically, as shown in FIG. 4, the directions of the movement vector passing through the center of the center of gravity of the facial region of the (t−1)th frame (FIG. 3A and the facial region of the t-th frame (FIG. 3B) are obtained. In the example of FIG. 4, movement vector $V_A$ passing through the center of gravity of facial region $A_{t-1}$ and facial region $A_t$ and a movement vector $V_B$ passing through the center of gravity of facial region $B_{t-1}$ and facial region $B_t$ both face the lower left. Therefore, the directions of the movement vector $V_A$ and the movement vector $V_B$ is determined to be lower left.

A tracking ID is assigned to each facial region. The tracking ID is stored together with tracking status, coordinates of the center of gravity in the (t−1)th frame, an evaluation value (score) of the facial likeness, coordinates of the center of gravity in the t-th frame and an evaluation value (score) of the facial likeness, and the directions of the movement vectors, as a tracking result in storage unit 14.

FIG. 5 shows an example of the tracking result stored in storage unit 14. In the following, facial region $A_{t-1}$ and facial region $A_t$ are simply referred to as facial region A in the case of being generically named, and facial region $B_{t-1}$ and facial region $B_t$ are simply referred to as facial region B in the case of being generally named. As shown in FIG. 5, facial region A is given a tracking ID "1", which is stored together with the tracking state "ON", the coordinates of the center of gravity and the score "center of gravity a1, score 96" in the (t−1)th frame, the coordinates of the center of gravity and the score "center of gravity a2, score 93" in the t-th frame, and the direction of movement vector $V_A$ "lower left". In addition, facial region B is given a tracking ID "2" and is stored together with the tracking state "ON", the coordinates of the center of gravity and the score "center of gravity b1, score 62" in the (t−1)th frame, the coordinates of the center of gravity and the score "center of gravity b2, score 65" in the t-th frame, and the direction of movement vector $V_B$ "lower left". In FIG. 5, the coordinates of the center of gravity are represented by a1, a2, b1, and b2, but in reality, the coordinates are x and y coordinates of the pixel corresponding to the center of gravity.

In the following step ST104, it is determined whether or not there are a plurality of facial regions in which the tracking state is ON in tracking region R of a predetermined size in the captured image. Since a facial region in which the tracking state is OFF does not exist between two adjacent image frames, the facial region is not a target to be determined for detection. Tracking region R is set by specifying the number of pixels in the vertical and horizontal directions. Tracking region R is appropriately set so as to include a detected facial region and a surrounding region. As an example, it is conceivable to set a rectangular area having a predetermined range around the detected facial region as tracking area R.

Figure 6:
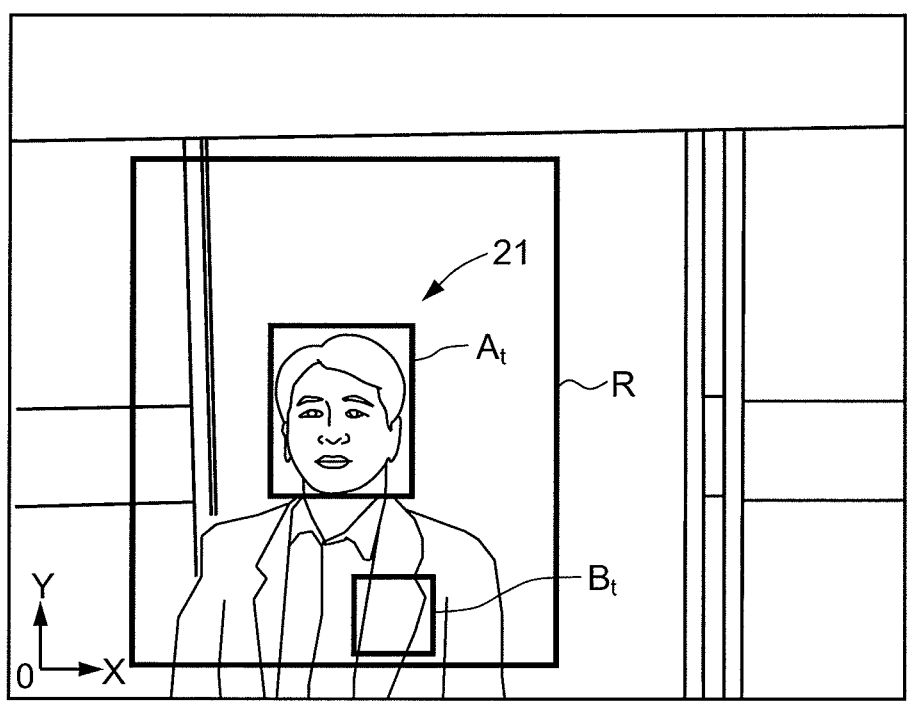
FIG. 6 is a diagram showing an example of a tracking range in a captured image.

FIG. 6 is a diagram showing an example of tracking region R. In FIG. 6, a rectangular region having a predetermined range centered on facial region $A_t$ is set as tracking region R, and it is determined whether or not there are a plurality of facial regions in which the tracking state is ON in tracking region R. In addition, concurrently therewith, it is also determined whether or not there are a plurality of facial regions in which the tracking state is ON in tracking region R (not shown) within the predetermined range centered on facial region $B_t$. In a case where a plurality of facial regions in which the tracking state is ON are detected in such tracking region R, it is conceivable that a portion moving together with person 21, for example, a portion of the clothes that person 21 is wearing and the like, is highly likely to be erroneously detected as a facial region. In the example of FIG. 6, since facial region $A_t$ and facial region $B_t$, which are the facial regions in which the tracking state is ON, exist in tracking region R, it is conceivable that at least one facial region is highly likely to be erroneously detected. As described above, it is also possible to set a plurality of tracking regions R in the captured image. In that case, the following processing is performed for each tracking region R.

In a case where it is determined that there are a plurality of facial regions in which the tracking state is ON in tracking region R (step ST104: Yes), the processing proceeds to step ST105, and in a case where it is determined that there are no plurality of facial regions in which the tracking state is On in tracking region R (step ST104: No), the processing proceeds to step ST109. In step ST109, the facial region detected from the captured image is output as correct detection, and thereafter the processing is terminated.

In the following step ST105, the correlation degree of the movement vectors between the facial regions is calculated. In the example of FIG. 3, the correlation degree between the movement vector of facial region A and the movement vector of facial region B is calculated. The correlation degree of the movement vectors (see FIG. 4) is calculated by using a known method. An example of the known method is to use a normalized correlation of vectors. As the correlation degree, for example, it is preferable to use a correlation value obtained by normalizing the similarities of the movement vectors in the range from −1 to +1.

Next, in step ST106, it is determined whether or not the correlation degree of the movement vectors between the facial regions is equal to or larger than predetermined threshold value T2. In a case where it is determined that the correlation degree is equal to or larger than threshold value T2 (step ST106: Yes), the processing proceeds to step ST107, and in a case where it is determined that the correlation degree is less than predetermined threshold value T2 (step ST106: No), the processing proceeds to step ST109. In step ST109, as described above, the facial region detected from the captured images is output as correct detection, and thereafter the processing is terminated.

In step ST107, error determination processing is performed for all the facial regions determined to have a correlation degree equal to or larger than threshold value T2 in the step ST106 to determine whether the detection is correct or not. In the example of FIG. 3, error determination processing of detection is performed for two facial regions of facial region A and facial region B. The number of facial regions to be determined by error determination processing is not limited to two, and for example, in a case where there are three facial regions in which the correlation degree is equal to or larger than threshold value T2, error detection processing of detection is performed for the three facial regions.

The error determination processing in step ST107 may be performed by any one of the following determination methods (1) to (3).

Figure 7:
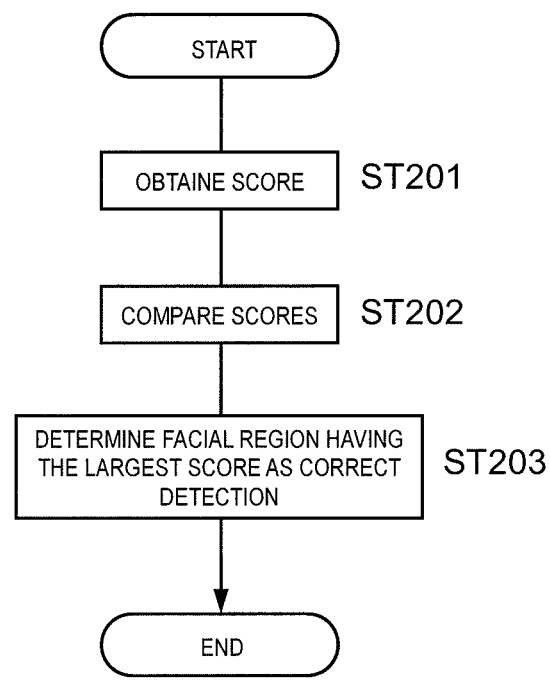
FIG. 7 is a flowchart showing a flow of error determination processing.

(1) The evaluation values of facial likeness of respective facial regions are compared with each other, a facial region having the largest score is determined as correct detection, and the other facial regions are determined as erroneous detection. More specifically, referring to the flowchart of FIG. 7, first, the score of each facial region in the t-th frame, which is calculated at the time of facial region detection in step ST101 and stored as a tracking result (see FIG. 5) in storage unit 14, is obtained (step ST201). Subsequently, the obtained scores of the respective facial regions are compared with each other (step ST202), and a facial region having the largest score is determined as correct detection (step ST203). A facial region other than the facial region determined as correct detection is determined as erroneous detection.

In the example of FIGS. 3 and 5, the score of facial region A (tracking ID: 1) in the t-th frame is 93 and the score in the t-th frame of facial region B (tracking ID: 2) is 65. Therefore, since the score of facial region A is larger than the score of facial region B, facial region A is determined as correct detection, and facial region B is determined as erroneous detection. In this way, by comparing the evaluation values (scores) of facial likeness of respective facial regions with each other, it is possible to easily determine the correctness of detection as a facial region. In this manner, it is possible to simply and easily eliminate erroneous detection in a case where a plurality of facial regions are detected in the captured images.

Figure 8:
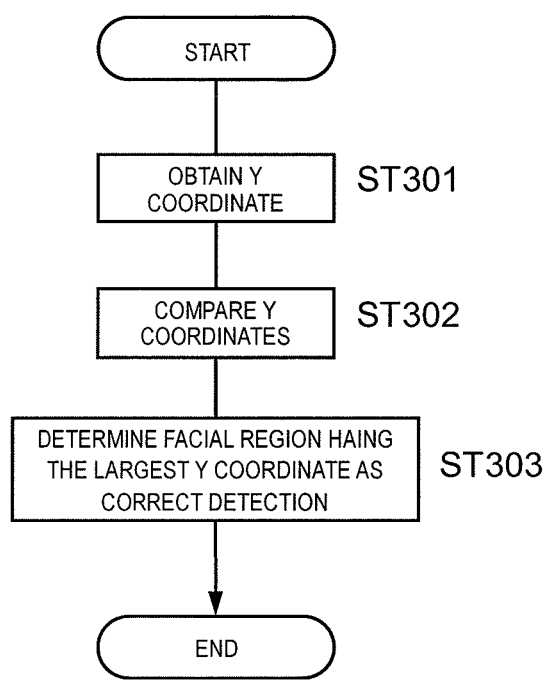
FIG. 8 is a flowchart showing a flow of the error determination processing.

(2) The y coordinate values of the center of gravity of respective facial region are compared with each other, a facial region having the largest y coordinate value is determined as correct detection, and the other facial regions are determined as erroneous detection. More specifically, referring to the flowchart of FIG. 8, first, the y coordinate value of the center of gravity of each facial region in the t-th frame, which is calculated at the time of facial region detection in ST101 and stored as a tracking result (see FIG. 5) in storage unit 14, is obtained (step ST301). Subsequently, the obtained y coordinates of the respective facial regions are compared with each other (step ST302), and a facial region having the largest y coordinate is determined as correct detection (step ST303). A facial region other than the facial region determined as correct detection is determined as erroneous detection.

In the examples of FIGS. 3 and 5, since facial region A is located above facial region B, the y coordinate value of the center of gravity of facial region A is larger than the y coordinate value of the center of gravity of facial region B. Therefore, facial region A is determined as correct detection, and facial region B is determined as erroneous detection. In this way, by comparing the y coordinate values of the center of gravity of respective facial regions with each other, it is possible to easily determine the correctness of detection as a facial region. In this manner, it is possible to simply and easily eliminate erroneous detection in a case where a plurality of facial regions are detected in the captured images. As in the example of FIG. 3, a facial region determined to be positive is often located above a facial region determined to be erroneous. Therefore, it is possible to simply and easily eliminate erroneous detection by determining the facial region having the larger y coordinate value of the center of gravity as correct detection. Since the facial region of a human being is located at the head, this determination method (2) is based on the premise that the facial region located on the foot side of person 21 is highly likely to be an erroneous determination as compared with the facial region located on the head side. In the examples of FIGS. 3 and 5, the y coordinate is used as a coordinate in the height direction of person 21, but since the coordinate system in the captured image depends on the definition thereof, instead of the y coordinate, another coordinate axis (for example, the x coordinate axis) may be used. Likewise, since the magnitude of the coordinate value depends on the definition of the coordinate system of the captured image, either the maximum value or the minimum value may be used as an extreme value in accordance with the definition of the coordinate system.

Figure 9:
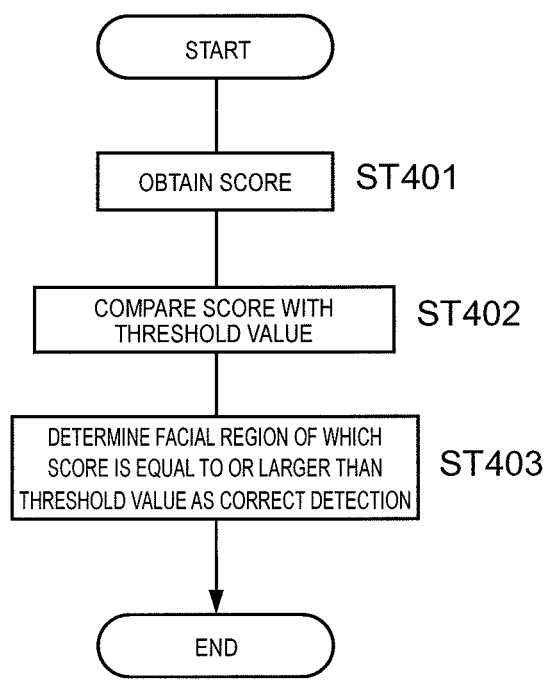
FIG. 9 is a flowchart showing a flow of the error determination processing.

(3) The evaluation value (score) of facial likeness of each facial region is compared with predetermined threshold value T3, and all the facial regions of which score is equal to or larger than threshold value T3 are determined as correct detection and the other facial regions are determined as erroneous detection. More specifically, referring to the flowchart of FIG. 9, first, the score of each facial region in the t-th frame, which is calculated at the time of facial region detection in step ST101 and stored as a tracking result (see FIG. 5) in storage unit 14, is obtained (step ST401). Subsequently, the scores of the obtained facial regions are compared with predetermined threshold value T3 (step ST402), and all the facial regions of which scores are equal to or larger than threshold value T3 are determined as correct detection (step ST403). A facial region other than the facial region determined as correct detection is determined as erroneous detection.

Threshold value T3 is set to a value larger than threshold value T1 used for detecting a facial region in step ST101. In the present embodiment, threshold value T1 is set to 60 and threshold value T3 is set to 70. In the example of FIGS. 3 and 5, the score of facial region A (tracking ID: 1) in the t-th frame is 93, which is equal to or larger than threshold value T2. In addition, the score of facial region B (tracking ID: 2) in the t-th frame is 65, which is less than threshold value T2. Therefore, facial region A is determined as correct detection, and facial region B is determined as erroneous detection. In this way, by comparing the evaluation value (score) of facial likeness of each facial region with the predetermined threshold value T3, it is possible to easily determine the correctness of detection as a facial region. In this manner, it is possible to simply and easily eliminate erroneous detection in a case where a plurality of facial regions are detected in the captured images. In addition, since all facial regions having high evaluation values of facial likeness are determined as correct detection, for example, even in a case where a plurality of persons are walking side by side, the facial regions of each person may be detected.

If necessary, determination based on illumination unevenness (how shadows are attached) may be combined. For example, in a case where a facial picture is printed on clothes that a person is wearing, the above method (3) may erroneously detect a picture of a face as a facial region. In this case, determination based on illumination unevenness may be supplementarily used. Since the picture of the face is a two-dimensional plane, the degree of illumination unevenness of the facial region image detected from the captured image becomes small. Therefore, by comparing the degree of illumination unevenness with a predetermined threshold value, it is possible to eliminate erroneous detection.

After the error determination processing in step ST107 is terminated, the processing proceeds to step ST108. In step ST108, erroneous detection is eliminated based on the accuracy determination result in step ST107, correct detection is output, and thereafter the processing is terminated. The elimination of the erroneous detection and the output of the correct detection are performed with respect to the facial region of the (t−1)th frame.

As described above, according to the present embodiment, in a case where a plurality of facial regions are detected in the captured images and the correlation degree of the movement vectors between the two captured images that are sequential in time series of the plurality of facial regions is equal to or larger than a predetermined threshold value, it is possible to simply and easily eliminate erroneous detection by performing error determination processing on the plurality of facial regions.

In the present embodiment, error determination processing of detection is performed for every frame, but error determination processing of detection may be performed for each predetermined number of frames instead of every frame. In this case, the tracking process is also performed between a frame and a frame that is a predetermined number of frames before, not between a frame and a previous frame.

In addition, in the present embodiment, the tracking processing in step ST103 is performed before the determination processing (step ST104) of determining whether or not there are a plurality of facial regions in which the tracking state is ON in tracking region R in the captured image, but the tracking processing in step ST103 may be performed after the determination processing in step ST104.

Although the present disclosure has been described based on specific embodiments, these embodiments are merely examples, and the present disclosure is not limited by these embodiments. All the constituent elements of the facial detection device according to the present disclosure, the facial detection system including the facial detection device, and the facial detection method described in the above embodiment are not necessarily all essential, and may be appropriately selected without departing from the scope of the present disclosure.

INDUSTRIAL APPLICABILITY

The facial detection device, the facial detection system including the facial detection device, and the facial detection method according to the present disclosure are useful as a facial detection device capable of eliminating erroneous detection in a case where a plurality of facial regions are detected in a captured image, a facial detection system including the facial detection device, a facial detection method, and the like.

REFERENCE MARKS IN THE DRAWINGS

1 FACIAL DETECTION SYSTEM
2 FACIAL DETECTION DEVICE
11 CAMERA (IMAGING DEVICE)
12 DISPLAY UNIT
13 INPUT UNIT
14 STORAGE UNIT
15 PROCESSOR
16 BUS
21 PERSON
22 CLOTHES
23 COLLAR PORTION

The invention claimed is:
1. A facial detection device that detects a facial region of a person from captured images which are continuous in time series, comprising:
 a processor that performs facial detection processing of detecting the facial region from the captured images, error determination processing of calculating moving directions of each facial region between the captured images that are sequential in time series, and determining whether or not detection as a facial region is correct with respect to a plurality of facial regions in which a correlation degree in the moving directions of the facial regions is equal to or larger than a predetermined threshold value, in a case where a plurality of facial regions are detected.

2. The facial detection device of claim 1,
wherein, by performing the error determination processing, a facial region having the largest evaluation value of facial likeness of the facial region is determined as correct detection and the other facial regions are determined as erroneous detection, in the plurality of facial regions in which the correlation degree of the moving directions of the facial regions is equal to or larger than the predetermined threshold value.

3. The facial detection device of claim 1,
wherein, by performing the error determination processing, a facial region, in which a coordinate value at a center of gravity of the facial region in a height direction of the person is an extreme value, is determined as correct detection and the other facial regions are determined as erroneous detection, in the plurality of facial regions in which the correlation degree of the moving directions of the facial regions is equal to or larger than the predetermined threshold value.

4. The facial detection device of claim 1,
wherein, by performing the error determination processing, a facial region in which an evaluation value of facial likeness of the facial region is equal to or larger than a predetermined threshold value is determined as correct detection and the other facial regions are determined as erroneous detection, in the plurality of facial regions in which the correlation degree of the moving directions of the facial regions is equal to or larger than the predetermined threshold value.

5. A facial detection system comprising:
the facial detection device according to claim 1; and
an imaging device that continuously captures a facial region of a person in time series.

6. A facial detection method for detecting a facial region of a person from captured images that are continuous in time series, comprising:
a facial detection processing step of detecting the facial region from the captured images, and
error determination processing step of calculating moving directions of each facial region between the captured images that are sequential in time series and determining whether or not detection as a facial region is correct with respect to a plurality of facial regions in which a correlation degree in the captured moving directions of the facial regions is equal to or larger than a predetermined threshold value, in a case where a plurality of facial regions are detected.

* * * * *